March 22, 1932.  W. J. MORRILL  1,850,765
SHADED POLE MOTOR
Filed Oct. 1, 1930

Inventor:
Wayne J. Morrill,
by *Charles E. Tullar*
His Attorney.

Patented Mar. 22, 1932

1,850,765

UNITED STATES PATENT OFFICE

WAYNE J. MORRILL, OF FORT WAYNE, INDIANA, ASSIGNOR TO GENERAL ELECTRIC COMPANY, A CORPORATION OF NEW YORK

SHADED POLE MOTOR

Application filed October 1, 1930. Serial No. 485,681.

The principal object of my invention is to provide an improved reversible shaded pole type induction motor. An additional and important object of my invention is to reduce the physical size and cost of reversible and nonreversible shaded pole type induction motors.

It is frequently desirable to have a shaded pole type induction motor whose direction of rotation is reversible by a single pole two-way switch with none of the motor windings energized when the switch is in the neutral position. For one direction of rotation of such a motor the exciting coils are energized to produce magnetic poles with the axis of each pole displaced to one side of the axis of the adjacent shading coil, and for the opposite direction of rotation the exciting coils are energized to produce magnetic poles with the axis of each pole displaced to the other side of the axis of the adjacent shading coil, the changes in connections necessary to obtain these results being accomplished by the single pole two-way switch placed between the exciting coils and the source of alternating current. My invention provides such a motor with the minimum amount of idle copper in the exciting windings by providing a motor primary member having a group of main exciting coils, one or two groups of auxiliary exciting coils and a group of shading coils.

Reversible shaded pole type induction motors are used for controlling radio dials and as these motors are usually made in very small horse-power ratings it is therefore desirable to reduce their physical size and cost to a minimum, although it is obvious that this is true to a great extent in most if not all shaded pole type motors as they are usually of small power ratings. My invention produces this result by providing a magnetic core for the motor primary member in which the end plates and rivets used for clamping together the core laminations also serve as shading coils for producing the shaded poles in the motor.

My invention will be best understod from the following description when considered in connection with the accompanying drawings while the features of my invention which are believed to be novel and patentable are pointed out in the claims appended hereto.

Figure 1A:
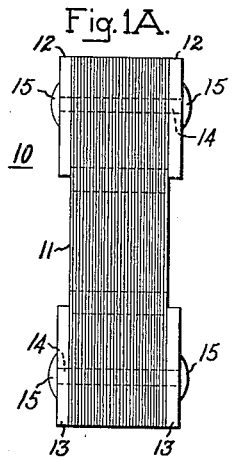
Figure 1B:
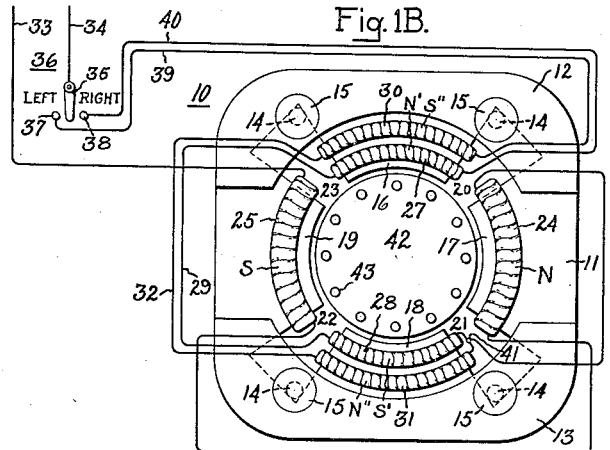
Figure 2:
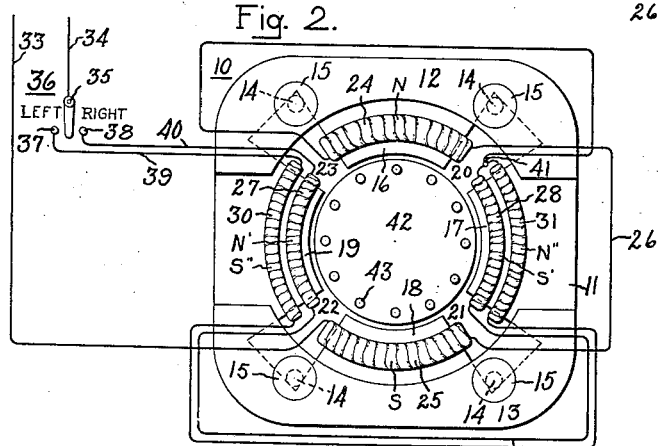
Figure 3:
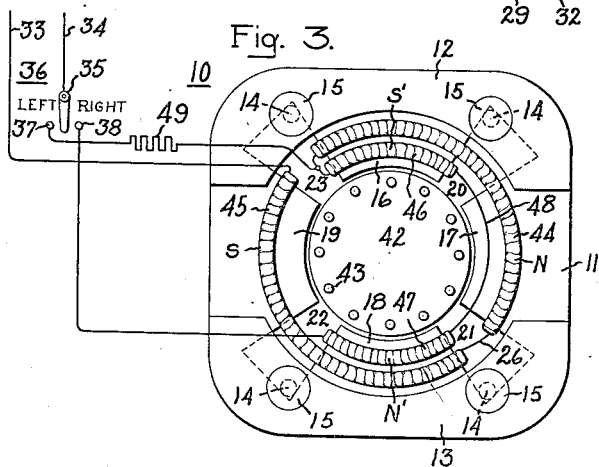

Fig. 1A represents a side view of the magnetic core for the motor primary member, and Fig. 1B represents an end view of the core with its windings and their connections and the rotor for a two-pole reversible shaded pole type induction motor having two main exciting coils, two groups of auxiliary exciting coils, and two shading coils which consist of the end plates and rivets used for clamping together the core laminations. Fig. 2 represents a modification of Fig. 1B, employing the same type of shading coils shown in Figs. 1A and 1B. Fig. 3 represents an end view of a two pole reversible shaded pole type induction motor having two main exciting coils, one group of auxiliary exciting coils, and two shading coils of the type shown in Figs. 1A and 1B.

In Fig. 1A, 10 represents the stationary magnetic core of the motor primary member, 11 represents the laminations of the core, 12 and 13 represent copper end plates for the core, 14 represents the bodies of copper rivets whose heads, represented by 15, are riveted over the plates to tightly clamp together the laminations 11 and the copper plates.

In Fig. 1B, the laminations 11 have the salient projections 16 to 19 inclusive and the slots 20 to 23 inclusive, there being a slot between adjacent projections. The slots contain the bodies of the copper rivets represented by the dotted circles 14 and the heads of these rivets are represented by the full circles 15. The sides of the main exciting coil 24 lie in slots 20 and 21, thus surrounding projection 17, and the sides of the main exciting coil 25 lie in slots 22 and 23, thus surrounding projection 19. The coils 24 and 25 are spaced substantially 180 electrical degrees apart and are connected in series by the lead 26 to form alternate magnetic poles whose polarities at an assumed instant are represented by N and S shown on the coils 24 and 25 respectively. One group of auxiliary exciting coils consists of the coil 27 whose sides lie in slots 20 and 23, thus surrounding projection 16, and the coil 28 whose sides lie in slots 21 and 22, thus surrounding projection 18. The coils 27 and 28 are spaced substantially 180 electrical degrees apart and are connected in series by the lead 29 to form alternate magnetic poles whose polarities at the assumed instant are represented by N' and S' shown on the coils 27 and 28 respectively. The other group of auxiliary exciting coils consists of the coil 30 whose sides lie in slots 20 and 23, thus surrounding projection 16, and the coil 31 whose sides lie in slots 21 and 22, thus surrounding projection 18. The coils 30 and 31 are spaced substantially 180 electrical degrees apart and are connected in series by the lead 32 to form alternate magnetic poles whose polarities at the assumed instant are represented by N'' and S'' shown on the coils 31 and 30 respectively. One free end of the main exciting coil 25 is connected to the line 33 of a single phase alternating current source whose other line represented by 34 is connected to the movable blade 35 of a two-way switch 36. A free end of each group of auxiliary exciting coils is connected to one or the other of the stationary contacts 37 and 38 of the switch 36 by means of the leads 39 and 40. The remaining free end of the main exciting coils and the remaining free end of each group of auxiliary exciting coils are interconnected at the point 41. The revolving secondary member may be of the squirrel cage or wound secondary type and in this case it is represented as a squirrel cage rotor 42 having the usual squirrel cage bars 43.

If the blade 35 is closed to the right the main exciting coils 24 and 25 will be connected in series with the auxiliary exciting coils 27 and 28. The coils 24 and 27 both produce magnetic flux with north poles and therefore the projections 16 and 17 act as one resultant north pole. The coils 25 and 28 both produce magnetic flux with south poles and therefore the projections 18 and 19 act as one resultant south pole spaced substantially 180 electrical degrees from the resultant north pole. The plates 12 and the rivets 14 in the slots 20 and 23 act as a shading coil surrounding the projection 16, thus producing a shaded pole effect and the magnetic flux in the projection 16 will lag in time phase behind the magnetic flux in the projection 17. The plates 13 and the rivets 14 in the slots 21 and 22 act as a shading coil surrounding the projection 18, thus producing a shaded pole effect and the magnetic flux in the projection 18 will lag in time phase behind the magnetic flux in the projection 19. It is therefore obvious that the rotor 42 will rotate in a counter-clockwise direction. If the blade 35 is closed to the left the main exciting coils 24 and 25 will be connected in series with the auxiliary exciting coils 30 and 31. The coils 24 and 31 both produce magnetic flux with north poles and therefore the projections 17 and 18 act as one resultant north pole. The coils 25 and 30 both produce magnetic flux with south poles and therefore the projections 16 and 19 act as one resultant south pole spaced substantially 180 electrical degrees from the resultant north pole. The plates 12 and the rivets 14 in the slots 20 and 23 will therefore cause the magnetic flux in the projection 16 to lag in time phase behind the magnetic flux of the projection 19. The plates 13 and the rivets 14 in the slots 21 and 22 will therefore cause the magnetic flux in the projection 18 to lag in time phase behind the magnetic flux in the projection 17. It is obvious therefore that the rotor 42 will rotate clockwise.

As the main exciting coils are used for either direction of rotation it is possible to make each auxiliary exciting coil appreciably smaller than a main exciting coil and therefore the motor will have the minimum amount of idle copper in its exciting windings. The functioning of the plates 12 and 13 and the rivets 14 as shading coils renders it unnecessary to provide the usual type of shading coils, thus reducing the physical size and cost of the motor. It is obvious, however, that the usual type of shading coils may be substituted in place of the copper plates and rivets and the motor will operate in the manner described. It will be readily apparent to those skilled in the art that this novel construction of having the end plates and rivets clamping the core laminations together also serving as shading coils is applicable to the usual type of nonreversible shaded pole motor as well as to any type of reversible or nonreversible motor employing the shading coil principle irrespective of the number of poles in the motor and the number of sets of main or auxiliary coils used. I therefore wish it understood that my invention is not to be limited to any particular type of shaded pole motor.

Fig. 2 is similar to Fig. 1B in all respects except that in Fig. 2 the main exciting coils 24 and 25 surround the projectons 16 and 18 respectively, the auxiliary exciting coils 27 and 30 surround the projection 19 and the auxiliary exciting coils 28 and 31 surround the projection 17. It is obvious that the motor will operate as described in connection with Figs. 1A and 1B.

In Fig. 3 similar parts to those in Fig. 1B are represented by the same numbers. In Fig. 3 the sides of the main exciting coils 44 and 45 lie in the slots 21 and 23 but the coils are spaced substantially 180 electrical degrees apart, and thus the coil 44 surrounds projections 16 and 17 and the coil 45 surrounds projections 18 and 19. The coils 44 and 45 are connected in series by the lead 26 to form alternate magnetic poles whose polarities at an assumed instant are represented by N and S shown on the coils 44 and 45 respectively. The sides of the auxiliary exciting coil 46 lie in slots 20 and 23 thus surrounding the projection 16. The sides of the auxiliary exciting coil 47 lie in slots 21 and 22, thus surrounding the projection 18. The coils 46 and 47 are spaced substantially 180 electrical degrees apart and are connected in series by the lead 48 to form alternate magnetic poles whose polarities at the assumed instant are represented by S' and N' shown on coils 46 and 47 respectively. The free ends of coils 45 and 47 are connected to line 33 and contact 38 respectively. The free ends of coils 44 and 46 are connected to one end of an impedance 49 whose other end is connected to contact 37, and 49 has approximately the same impedance as the sum of the impedances of coils 46 and 47. If the blade 35 is closed to the left the main exciting coils 44 and 45 will be connected in series with the impedance 49 to the lines 33 and 34 and a certain value of current will flow in the coils 44 and 45. The coils 46 and 47 will not be energized and it is clear that the motor will be connected as the usual type of shaded pole motor. The coil 44 will produce a certain value of flux with north polarity in the projections 16 and 17 and the plates 12 and the rivets 14 in the slots 20 and 23 will cause the flux in 16 to lag in time phase behind the flux in 17. The coil 45 will produce about the same value of flux with south polarity in the projections 18 and 19 and the plates 13 and the rivets 14 in the slots 21 and 22 will cause the flux in 18 to lag in time phase behind the flux in 19. It is therefore obvious that the rotor 42 will rotate counterclockwise. If the blade 35 is closed to the right the impedance 49 will be disconnected, the main exciting coils 44 and 45 will be connected in series with the auxiliary exciting coils 46 and 47 to the lines 33 and 34 and approximately the same value of current will flow through all the coils as flowed through the coils 44 and 45 with the blade 35 to the left. The value of the flux and their polarities in the projections 17 and 19 will be about the same as with blade 35 closed to the left. The value of the flux in the projections 16 and 18 will also be about the same as with the blade 35 closed to the left, but their polarities will be opposite to what they were with the blade 35 closed to the left because the number of turns in the coils 46 and 47 and their connections relative to those of coils 44 and 45 are such that coil 46 produces a magnetomotive force in projection 16 that opposes and is sufficient to overcome the magnetomotive force in 16 due to coil 44 and leave a magnetomotive force in 16 of the same value but in the opposite direction to that existing with the blade 35 closed to the left, and the same is true with respect to the magnetomotive force produced by the coil 47 in the projection 18. The projection 16 therefore has a south pole magnetic flux which lags in time phase behind the S pole flux in projection 19 and the projection 18 has a north pole magnetic flux which lags in time phase behind the N pole flux in projection 17. It is therefore obvious that the rotor 43 will rotate clockwise. It is clear that the usual type of shading coils may be substituted in place of the copper plates and rivets and the motor will operate in the manner described.

I have described my invention in connection with two pole motors having stationary primary members but it is obvious that my invention is applicable to motors with any number of poles and with any number of sets of main and auxiliary exciting coils regardless whether the motors have stationary or rotatable primary members. I therefore wish it understood that the embodiments represented are merely to illustrate the principles of my invention and all modifications within the true spirit and scope of my invention are intended to be included within the scope of the appended claims.

What I claim as new and desire to secure by Letters Patent in the United States is:

1. An alternating current motor of the shaded pole type comprising a laminated field element having salient projections, an exciting coil for producing a flux in a plurality of said projections, and metallic means for clamping together the laminations of said field element, said means being located on said field element so as to form a short circuited turn around some of said plurality of projections, thereby causing said clamping means to serve simultaneously, as a shading coil for said motor.

2. An alternating current motor of the shaded pole type comprising a laminated field element having salient projections and an exciting coil for producing a flux in said field element and means for shading the flux in one projection with respect to the flux in another projection, the said means consisting of metallic plates on opposite ends of the projection to be shaded, metallic sections passing on both sides of the projection to be shaded, said metallic sections being secured to said metallic plates to act as a shading coil for the projection to be shaded and simultaneously clamp together the laminations of said field element.

3. A reversible alternating current motor of the shaded pole type comprising a field element having salient projections, a main exciting coil, an auxiliary exciting coil whose axis is displaced to one side of the axis of the main exciting coil, another auxiliary exciting coil whose axis is displaced to the other side of the axis of the main exciting coil, each of said exciting coils surrounding separate projections, the main exciting coil to be selectively energized with one or the other of said auxiliary exciting coils to produce simultaneously magnetic fluxes of the same polarity for respective operation of the motor in one or the other direction of rotation, and means for causing the flux in the projection surrounded by an energized auxiliary exciting coil to lag in time phase behind the flux in the projection surrounded by the main exciting coil.

4. A reversible alternating current motor of the shaded pole type comprising a field element having salient projections, a main exciting coil, an auxiliary exciting coil whose axis is displaced to one side of the axis of the main exciting coil, another auxiliary exciting coil whose axis is displaced to the other side of the axis of the main exciting coil, each of said exciting coils surrounding separate projections, the main exciting coil to be selectively energized with one or the other of said auxiliary exciting coils to produce simultaneously magnetic fluxes of the same polarity for respective operation of the motor in one or the other direction of rotation, and means for causing the flux in the projection surrounded by the main exciting coil to lag in time phase behind the flux in the projection surrounded by an energized auxiliary exciting coil.

5. A reversible alternating current motor of the shaded pole type comprising a field element having salient projections, a main exciting coil surrounding at least one projection, an auxiliary exciting coil whose axis is displaced to one side of the axis of the main exciting coil and surrounds at least one projection, another auxiliary exciting coil whose axis is displaced to the other side of the axis of the main exciting coil and surrounds at least one projection, the main exciting coil to be selectively energized with one or the other of said auxiliary exciting coils to produce simultaneously magnetic fluxes of the same polarity for respective operation of the motor in one or the other direction of rotation, and a shading coil surrounding the same projection that is surrounded by a main exciting coil.

6. A reversible alternating current motor of the shaded pole type comprising a laminated field element having salient projections, a main exciting coil surrounding at least one projection, an auxiliary exciting coil whose axis is displaced to one side of the axis of the main exciting coil and surrounds at least one projection, another auxiliary exciting coil whose axis is displaced to the other side of the axis of the main exciting coil and surrounds at least one projection, the main exciting coil to be selectively energized with one or the other of said auxiliary exciting coils to produce simultaneously magnetic fluxes of the same polarity for respective operation of the motor in one or the other direction of rotation, and means for causing the flux in the projection surrounded by the main exciting coil to lag in time phase behind the flux in the projection surrounded by an energized auxiliary coil for either direction of motor rotation, the said means comprising metallic plates on opposite ends of the projection surrounded by the main exciting coil, metallic sections passing on both sides of the projection surrounded by the main exciting coil, said metallic sections being secured to said metallic plates to act as a shading coil for the projection surrounded by the main exciting coil and simultaneously clamp together the laminations of said field element.

7. A reversible alternating current motor of the shaded pole type comprising a field element having salient projections, a main exciting coil surrounding at least one projection, an auxiliary exciting coil whose axis is displaced to one side of the axis of the main exciting coil and surrounds at least one projection, another auxiliary exciting coil whose axis is displaced to the other side of the axis of the main exciting coil and surrounds at least one projection, the main exciting coil to be selectively energized with one or the other of said auxiliary exciting coils to produce simultaneously magnetic fluxes of the same polarity for respective operation of the motor in one or the other direction of rotation, and a shading coil surrounding the same projection that is surrounded by an auxiliary exciting coil.

8. A reversible alternating current motor of the shaded pole type comprising a laminated field element having salient projections, a main exciting coil surrounding at least one projection, an auxiliary exciting coil whose axis is displaced to one side of the axis of the main exciting coil and surrounds at least one projection, another auxiliary exciting coil whose axis is displaced to the other side of the axis of the main exciting coil and surrounds at least one projection, the main exciting coil to be selectively energized with one or the other of said auxiliary exciting coils to produce simultaneously fluxes of the same magnetic polarity for respective operation of the motor in one or the other direction of rotation, and means for causing the flux in the projection surrounded by an energized auxiliary exciting coil to lag in time phase behind the flux in the projection surrounded by the main exciting coil for either direction of motor rotation, the said means comprising metallic plates on opposite ends of the projections surrounded by said auxiliary exciting coils, metallic sections passing on both sides of the projections surrounded by the auxiliary exciting coils, said metallic sections being secured to their corresponding metallic plates to act as shading coils for the projections surrounded by the auxiliary exciting coils and simultaneously clamp together the laminations of said field element.

9. In combination, a source of alternating current, a reversible induction machine having relatively movable primary and secondary members, said primary member consisting of a magnetic core having a plurality of salient projections, N main exciting coils each surrounding at least one projection, N being any even number, at least N auxiliary exciting coils each surrounding at least one projection, the magnetic axes of said auxiliary exciting coils being displaced from the magnetic axes of said main exciting coils, N shading coils surrounding some of the projections with at least one unshaded projection between consecutive shaded projections, and two-way switching means adapted to connect the exciting windings to said source so that the magnetic flux in each shaded projection will lag in time phase behind the magnetic flux in an adjacent unshaded projection lying on one side or the other side of said each shaded projection according to the closed position of said switching means, the said switching means being arranged so that in at least one closed position thereof the N main exciting coils and at least N auxiliary exciting coils are energized by said source.

10. In combination, a source of alternating current, a reversible induction machine having relatively movable primary and secondary members, said primary member consisting of a magnetic core having a plurality of salient projections, N main exciting coils each surrounding at least one projection, N being any even number, two groups of auxiliary exciting coils with each coil surrounding at least one projection, each of said groups consisting of N coils, the magnetic axes of said auxiliary coils being displaced from the magnetic axes of said main exciting coils with an auxiliary coil from each of said groups located on either side of each main exciting coil, N shading coils surrounding some of the projections with at least one unshaded projection between consecutive shaded projections, and means adapted to connect the main exciting coils and either group of auxiliary exciting coils to said source.

11. In combination, a source of alternating current, a reversible induction machine having relatively movable primary and secondary members, said primary member consisting of a magnetic core having 2N salient projections, N being any even number, a main exciting coil surrounding every other projection, two groups of auxiliary exciting coils, each group consisting of N coils with an auxiliary exciting coil from each group surrounding each of the remaining projections, a shading coil surrounding alternate projections, and means adapted to connect the main exciting coils and either group of auxiliary exciting coils to said source.

12. In combination, a source of alternating current, a reversible induction machine having relatively movable primary and secondary members, said primary member consisting of a magnetic core having 2N salient projections, N being any even number, a main exciting coil surrounding every other projection, two groups of auxiliary exciting coils, each group consisting of N coils with an auxiliary exciting coil from each group surrounding each of the remaining projections, a shading coil surrounding each of said remaining projections, and means adapted to connect the main exciting coils and either group of auxiliary exciting coils to said source.

13. In combination, a source of alternating current, a reversible induction machine having relatively movable primary and secondary members, said primary member consisting of a magnetic core having 2N salient projections, N being any even number, a main exciting coil surrounding every other projection, two groups of auxiliary exciting coils, each group consisting of N coils with an auxiliary exciting coil from each group surrounding each of the remaining projections, a shading coil surrounding each projection that is surrounded by a main exciting coil, and means adapted to connect the main exciting coils and either group of auxiliary exciting coils to said source.

14. In combination, a source of alternating current, a reversible induction machine having relatively movable primary and secondary members, said primary member consisting of a magnetic core having 2N salient projections, N being any even number, N main exciting coils each surrounding a pair of projections, N auxiliary exciting coils respectively surrounding one of the projections surrounded by the respective main exciting coils, a shading coil surrounding each projection surrounded by an auxiliary exciting coil, and two-way switching means adapted in one position to connect only the main exciting coils to said source and in the other position to connect the main and auxiliary exciting coils to said source with each main and auxiliary exciting coil that surround a common projection producing opposing magnetomotive forces.

15. A single phase self-starting reversible alternating current motor comprising a magnetic core having projections, a group of main exciting coils surrounding some of said projections, two groups of auxiliary exciting coils surrounding some of said projections with the magnetic axes of a coil from each group displaced to one side of the magnetic axis of each main exciting coil and with the magnetic axes of a coil from each group displaced to the opposite side of the magnetic axis of each main exciting coil, the group of main exciting coils to be selectively energized with one or the other of the groups of auxiliary exciting coils for simultaneously producing magnetic fluxes of the same polarity in the projection surrounded by a main exciting coil and one or the other of its adjacent energized auxiliary exciting coils for respective operation of the motor in one or the other direction of rotation, and means for causing the flux in the projection surrounded by an auxiliary exciting coil to lag in time phase behind the flux in that projection which has the same magnetic polarity and which is surrounded by an adjacent main exciting coil.

16. A single phase self-starting reversible alternating current motor comprising a magnetic core having projections, a group of main exciting coils surrounding some of said projections, two groups of auxiliary exciting coils surrounding some of said projections with the magnetic axes of a coil from each group displaced to one side of the magnetic axis of each main exciting coil and with the magnetic axes of a coil from each group displaced to the opposite side of the magnetic axis of each main exciting coil, the group of main exciting coils to be selectively energized with one or the other of the groups of auxiliary exciting coils for simultaneously producing magnetic fluxes of the same polarity in the projection surrounded by a main exciting coil and one or the other of its adjacent energized auxiliary exciting coils for respective operation of the motor in one or the other direction of rotation, and means for causing the flux in the projection surrounded by a main exciting coil to lag in time phase behind the flux in that projection which has the same magnetic polarity and which is surrounded by an adjacent auxiliary exciting coil.

17. A single phase self-starting reversible alternating current motor comprising a magnetic core having projections, a group of main exciting coils each of which surrounds at least two projections, a group of auxiliary exciting coils respectively surrounding one of the projections surrounded by the respective main exciting coils, the group of main exciting coils to be selectively energized alone or with the group of auxiliary exciting coils for simultaneously producing magnetic fluxes of the same or opposite polarities in the projections surrounded by the respective main exciting coils for respective operation of the motor in the one or the other direction of rotation, and means for producing a time phase displacement between the fluxes in the projections surrounded by each main exciting coil.

18. An alternating current magnetic field structure comprising a stack of laminations having plurality of projections some of which are to be shaded with respect to the remaining projections, a separate metallic plate at opposite ends of each projection to be shaded, each metallic plate being appreciably thicker than a single lamination, and metallic rods passing on both sides of each projection to be shaded, said metallic rods being rigidly secured to their corresponding metallic plates so as to clamp said laminations together into a unitary structure and simultaneously form a shading coil around each projection that has metallic plates at its opposite ends.

19. An alternating current motor of the shaded pole type comprising a laminated magnetic field core having salient projections, exciting windings on said core for producing a multi-polar magnetic flux in said projections, and metallic means for clamping together the laminations of said core, said means being located on said core so as to form separate short circuited turns around some of the projections having the respective magnetic poles, thereby causing said clamping means to serve simultaneously as separate shading coils for the projections having the respective magnetic poles.

In witness whereof, I have hereunto set my hand this 29th day of September, 1930.

WAYNE J. MORRILL.